Figure 1:
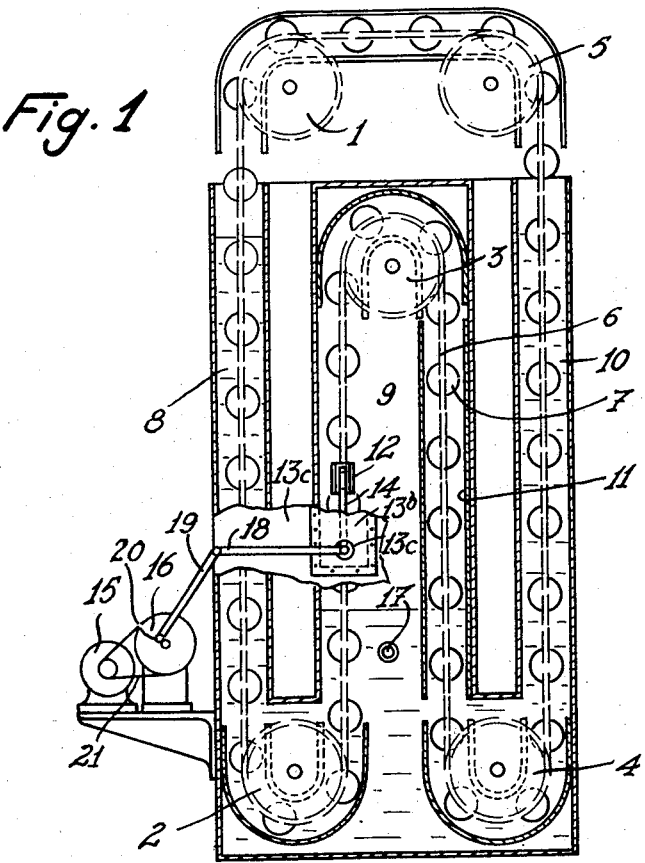

Jan. 17, 1961  P. CARVALLO  2,968,232
APPARATUS FOR THE HEAT TREATMENT OF
PRODUCTS IN SEALED CONTAINERS
Filed Sept. 14, 1955

United States Patent Office 2,968,232
Patented Jan. 17, 1961

2,968,232

APPARATUS FOR THE HEAT TREATMENT OF PRODUCTS IN SEALED CONTAINERS

Pierre Carvallo, 22bis Rue Marbeau, Paris, France

Filed Sept. 14, 1955, Ser. No. 534,364

Claims priority, application France Sept. 28, 1954

1 Claim. (Cl. 99—360)

The present invention relates to improvements in apparatus for effecting the heat treatment of products in sealed containers and more particularly in apparatus for the continuous process of sterilisation and cooling of food products in metal or glass containers, or of beverages such as milk or beer.

These improvements are applicable more particularly to apparatus of the aforesaid character which comprise metal section crates, frames or the like, and are driven by a pair of endless parallel chains movable along circuits comprising mainly vertical sections extending through the space where the heat treatment is carried out.

In apparatus of this type the containers are not adapted to be jolted along the vertical paths of their circuits and this feature, which is advantageous as far as certain products are concerned, is detrimental with other products.

According to the present invention a heat-treatment apparatus of the general type defined hereinabove is equipped with a device adapted to shake the products at least in one of the vertical paths of its conveyor circuit, the jolting or shaking occasioned by the device being preferably independent of the general driving movement of the conveyor chains, adjustable as to its strength and frequency, and adapted to be started or stopped at will, according to needs.

According to a specific form of embodiment of the invention, this shaking or agitation is obtained by means of members adapted to act upon the conveyor chains or like members at one or several points therealong so as to impart a vibratory or oscillatory motion thereto which motion is transmitted to said crates or like transport means and then to said products in sealed containers placed in said crates or the like.

Figure 2:
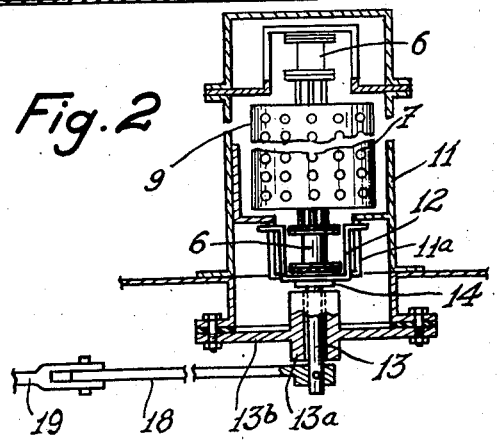

Other features and advantages of the present invention will appear as the following description proceeds with reference to the accompanying drawings forming part of this specification and illustrating diagrammatically by way of example a form of embodiment thereof. In the drawings:

Figure 1 is a diagrammatical vertical section showing a sterilising apparatus; and Figure 2 is a detail view showing on a larger scale and in cross-section the agitator associated with the apparatus of Fig. 1.

As illustrated in Fig. 1, the sterilising apparatus shown therein comprises vats and chambers through which the containers with the product to be treated are caused to travel. For this purpose these vats and chambers are provided with sprockets or pulleys 1, 2, 3, 4 and 5 over which a pair of endless conveyor chains 6 pass, as shown. These endless chains 6 carry crates or like transport devices 7 in which the containers to be heat-treated are placed and from which these containers are removed upon completion of the treatment. These steps of moving the containers in or out from the crates, as well as the devices employed to this end, are well known and therefore any detailed description thereof is deemed unnecessary.

Adequate section members 11 are provided for guiding the chains and crates along their paths.

If it is desired to agitate the products, for example along the vertical path from sprocket 2 to sprocket 3, one portion of the guide section 11 is hollowed as shown in Fig. 2 by a recess 11a and in said recess is placed a clevis 12 having such shapes and dimensions as to accommodate the chain therein. This clevis is rigidly connected to a depending arm 14 carrying on its lower end a shaft 13 journalled in a bearing 13a mounted or formed in a cover plate 13b secured in fluid-tight manner on the registering lateral wall 13c of the sterilising apparatus. The aforesaid shaft 13 is also rigid with a crank 18 connected through a connecting rod 19 to an eccentric crank-pin 20 carried by a disc 16 rotatably driven through a suitable transmission 21 from a motor 15.

The device described hereinabove operates as follows:

When the motor 15 is running, the clevis 12 agitates the chain 6 in a substantially transverse direction so that the crates or like elements are shaken along the path between sprockets 2 and 3; if it is desired to discontinue this agitation, the motor 15 is stopped and the apparatus will then operate without jolts.

If the distance from sprocket 2 to sprocket 3 is relatively long, a plurality of similar agitators may be provided therealong so as to act preferably with an interaction or conjugate effect; these devices will be disposed along the conveyor chain while taking into account the velocity of travel and beat frequency of the chain proper and of the elements attached thereto in order to reduce the power requirements; of course, these arrangements and beat frequencies may be altered if necessary, for example according to the character of the product to be shaken.

The apparatus may be equipped with a single agitator of the above-described type, disposed on one side only; it is also possible to provide a plurality of similar devices.

Of course, the conveyor system described hereinabove is of the type adapted to circulate cylindrical or like crates independent of the chains. However, the invention is not restricted to this type of apparatus as it is also applicable to any other conveyor systems, notably those wherein the crates or like transport devices are secured through straps and the like, those wherein this fixation is either permanent or of the quickly-detachable type, and also to crates of the basket or bucket type, etc. Again, the invention is applicable to chain conveyors wherein the containers for the products to be treated are held by section members constituting adequate recesses or grip means.

Although a form of embodiment of the invention has been shown and described herein, it will be readily understood that many modifications may be brought thereto without departing from the spirit and scope of the invention.

What I claim is:

In an apparatus for the thermal treatment of products contained in sealed containers, one chain conveyor comprising one pair of parallelly disposed chains, transport means for said sealed containers, securing means between said chains and said transport means, at least one pair of nearly vertical stationary guide-means for at least a part of each of said chains of said chain conveyor, at least a movable clevis disposed astride one of said chains in the path determined by one of said guide-means, said clevis being disposed in a corresponding recess formed in said guide-means, a motor, a connecting rod mechanism actuated in alternative motion by said motor, a crank actuated by said connecting rod mechanism, said crank being connected to an oscillating shaft, a fluid-tight journal for said shaft and an arm integral with said shaft, said arm being attached to said clevis, whereby the motion of said clevis is transmitted to said corresponding chain, to said transport means and to said sealed containers herein disposed.

References Cited in the file of this patent

UNITED STATES PATENTS

| | | |
|---|---|---|
| 965,802 | Flounders | July 26, 1910 |
| 994,192 | Pinkney | June 6, 1911 |
| 1,098,551 | Beckman | June 2, 1914 |
| 1,584,397 | Paxton | May 11, 1926 |
| 1,749,150 | Meyer | Mar. 4, 1930 |
| 2,042,685 | Stephens et al. | June 2, 1936 |
| 2,624,474 | Hapman | Jan. 6, 1953 |
| 2,642,795 | Bingham | June 23, 1953 |
| 2,710,260 | Reed | June 7, 1955 |
| 2,719,478 | Van der Winden | Oct. 4, 1955 |